US006780104B2

(12) United States Patent
Fox

(10) Patent No.: US 6,780,104 B2
(45) Date of Patent: Aug. 24, 2004

(54) METHOD OF PLAYING A CARD GAME

(75) Inventor: John Fox, Omaha, NE (US)

(73) Assignee: Stanley E. Fulton, Las Vegas, NV (US)

( * ) Notice: Subject to any disclaimer, the term of this patent is extended or adjusted under 35 U.S.C. 154(b) by 0 days.

(21) Appl. No.: 10/230,242

(22) Filed: Aug. 28, 2002

(65) Prior Publication Data

US 2003/0092475 A1 May 15, 2003

Related U.S. Application Data

(60) Provisional application No. 60/368,483, filed on Mar. 29, 2002, and provisional application No. 60/339,039, filed on Nov. 12, 2001.

(51) Int. Cl.$^{7}$ .......................... A63F 13/00; A63F 9/24; G06F 17/00; G06F 19/00

(52) U.S. Cl. .............................. 463/13; 463/1; 463/25; 463/42; 273/292

(58) Field of Search ........................... 463/1–9, 13, 25, 463/40–42; 273/292

(56) References Cited

U.S. PATENT DOCUMENTS

| | | | | |
|---|---|---|---|---|
| 4,095,795 A | | 6/1978 | Saxton et al. | |
| 4,448,419 A | | 5/1984 | Telnaes | |
| 4,651,997 A | | 3/1987 | Wood | |
| 4,711,451 A | | 12/1987 | Pajak et al. | |
| 5,046,735 A | | 9/1991 | Hamano et al. | |
| 5,356,140 A | * | 10/1994 | Dabrowski et al. | 463/12 |
| 5,401,023 A | | 3/1995 | Wood | |
| 5,489,101 A | | 2/1996 | Moody | |
| 5,511,781 A | | 4/1996 | Wood et al. | |
| 5,531,448 A | | 7/1996 | Moody | |
| 5,544,892 A | | 8/1996 | Breeding | |
| 5,660,393 A | | 8/1997 | Dreger | |
| 5,697,614 A | | 12/1997 | Potter et al. | |
| 5,732,950 A | | 3/1998 | Moody | |
| 5,785,593 A | | 7/1998 | Wood et al. | |
| 5,816,915 A | | 10/1998 | Kadlic | |
| 5,816,916 A | | 10/1998 | Moody | |
| 5,823,873 A | | 10/1998 | Moody | |
| 5,839,731 A | | 11/1998 | Feola | |
| 5,868,618 A | | 2/1999 | Netley et al. | |
| 5,868,619 A | | 2/1999 | Wood et al. | |
| 5,954,335 A | | 9/1999 | Moody | |
| 6,007,066 A | | 12/1999 | Moody | |
| 6,019,374 A | | 2/2000 | Breeding | |
| 6,379,248 B1 | | 4/2002 | Jorasch et al. | |
| 6,435,509 B2 | * | 8/2002 | Wichinsky et al. | 414/805 |
| 6,443,456 B1 | * | 9/2002 | Gajor | 273/303 |
| 6,520,856 B1 | | 2/2003 | Walker et al. | |

* cited by examiner

*Primary Examiner*—Teresa Walberg
*Assistant Examiner*—Robert Mendoza
(74) *Attorney, Agent, or Firm*—Caesar, Rivise, Bernstein, Cohen & Pokotilow, Ltd

(57) ABSTRACT

A method of playing a card game is provided which includes the steps of providing a set of card hand locations, betting at least one credit at each of the card hand locations, dealing a first hand of cards at a first of the card hand locations from a deck of cards, determining a mathematical value for the first hand of cards, dealing hands of cards at all remaining card hand locations, each hand having a mathematical value about equal to the mathematical value of the first hand, and crediting in accordance with a pay table associated with the value of each hand played.

34 Claims, 2 Drawing Sheets

METHOD OF PLAYING A CARD GAME

CROSS-REFERENCES TO RELATED APPLICATIONS

This utility application claims the benefit of U.S. Provisional Application Serial No. 60/339,039, by John Fox, entitled Video Gaming System filed Nov. 12, 2001 and U.S. Provisional Application Serial No. 60/368,483, by John Fox, entitled Video Gaming System, filed Mar. 29, 2002.

BACKGROUND OF THE INVENTION

This invention relates to the field of gaming and gambling, and, in particular, to video gambling devices and games that offer the player the opportunity to play multiple hands on a single game cycle and give the player the choice to pick the hands they wish to play at a given time.

Gambling or gaming devices have been in use for decades and were originally introduced in the $19^{th}$ century. Major advancements in technology of gaming devices occurred when microprocessors were introduced in the field. Advancements were divided into two major segments in their development. The first advancement was mechanical spinning reels and the second was use of "CRT" displays or animated displays of reels, cards, keno boards, and "21 " games. The emergence of such microprocessor devices has opened a vast set of possibilities to gambling device designers. U.S. Pat. No. 4,095,795 (Saxton et al.) describes what is believed to be the first microprocessor slot machine.

Another major advancement used microprocessors and a software program to adjust the odds of achieving any particular combination or game outcome. For example, U.S. Pat. No. 4,448,419 (Moody) describes a mechanical reel slot machine controlled by a microprocessor. The software program allowed for the control of the reels and the varying of odds of achieving any particular combination of symbols. Similarly, U.S. Pat. No. 4,711,451 (Pajak et al.) describes a gambling device using mechanical reels but is controlled by a microprocessor.

Microprocessors along with the lowering prices of color monitors allowed the expansion of the second largest area of gambling devices. These devices, known as "Video Games" included video slots, 21, bingo, keno, and poker machines. The largest portion of this segment of the gaming field is the video poker machine.

Historically, video poker has simulated an actual game of cards by using a standard 52 card deck (53 if a joker is used). Thus, the games' payout percentage is controlled by two factors. The number and type of defined winning combinations and the amount that will be awarded if those hands are obtained.

These video poker games would randomly shuffle the deck of cards and deal five cards to the player. The approximate probability of obtaining any of the following winning hands in the initially dealt cards is listed below.

| | |
|---|---|
| Royal Flush | .00015% |
| Straight Flush | .0014% |
| Four of a Kind | .03% |
| Full House | .15% |
| Flush | .2% |
| Straight | .4% |
| Three of a Kind | 2.0% |
| Two Pair | 5.0% |
| Jacks or Better | 12.8% |

However, video poker games provide the opportunity to "hold" or "discard" any number of the player's initially dealt cards and draw new cards from the remaining cards left in the deck. Therefore, the odds of obtaining a winning hand on the draw are dependent on the initially dealt cards, and thus removed from the finite number of cards in the deck. The player can therefore calculate, or make an approximation, of the odds of drawing a winning hand depending on which cards they decide to retain or discard.

The sizes of the awards that are offered on poker machines are a function of two items, the winning combinations and the amount awarded for those combinations. Thus, if a large amount was offered for a Royal Flush with five coins, the amount paid for lessor combinations must be reduced.

U.S. Pat. No. 5,046,735 (Hamano et al.) calculated all possible drawn hands of poker. In U.S. Pat. No. 5,401,023 (Wood), the payable changes with the cards that are being held. This was good for the players but the casinos lost the additional money earned from improper play. U.S. Pat. No. 5,511,781 (Wood et al.) allowed the player to stop the game before the draw and be awarded a higher pay for an existing winning combination. In U.S. Pat. No. 5,785,593 (Wood et al.), the player was allowed to swap the cards used in a particular poker hand. In U.S. Pat. No. 5,868,619 (Wood et al.), players were allowed to re-arrange an existing poker hands into sub hands. U.S. Pat. No. 44,651,997 (Wood) allowed the player to purchase a sixth card to add to an existing five card poker hand. U.S. Pat. No. 5,954,335 (Moody) allowed the player to play multiple 21 hands on the video screen that were duplicated from the first hand dealt. U.S. Pat. No. 5,823,873 (Moody) offered the player the opportunity to play two or three hands that were duplicated from the first hand dealt. U.S. Pat. No. 5,816,916 (Moody) increased the number of hands that could be played to five hands that were dealt from a single deck. Again these hands were duplicated from the first hand dealt. U.S. Pat. Nos. 5,531,448 and 5,489,101 gave the players the opportunity to play a three or five card hand using a community set of cards of either six or eight cards that were used by all the players.

U.S. Pat. No. 6,019,374 (Breeding) allows a player to make multiple bets on a single hand and additionally allows the player to withdraw a portion of those bets during game play. In U.S. Pat. No. 6,007,066 (Moody), the device is for a card game that has at least two to "X" rows of card hands. The player then determines which cards to hold in a specific hand and those hold cards are duplicated in all the other hands. The cards held would be displayed in the same positions in all the other hands in a vertical display. The game could draw all the replacement cards from a single deck or use a different deck for each row of cards. It also allows a player to see one of the dealt hands before the player bets on any additional hands that are offered. It also allows the option of displaying a different number of cards or amount of hands and allows the player the option to bet on those hands after the deal. U.S. Pat. No. 5,868,618 (Netley et al.) describes a device that allows a two-tiered poker game that displays two separate poker hands to the player, and are displayed in different colors on the video display. If the first hand is won, the player is allowed to wager that bet on the second hand. U.S. Pat. No. 5,839,731 (Feola) describes a method of play that includes dealing a multiple amount of hands and allowing the player to bet on the hand they believe will be the winning hand. U.S. Pat. No. 5,823,873 (Moody) describes a method of play that allows two or three rows of poker hands to be displayed on the screen. The player is allowed to place a wager on one or all three hands after the hands are dealt face up. The player then selects the cards that their want to hold from the first hand and those cards are duplicated to all the other hands that have bets wagered on them. Then replacement cards are dealt to each hand and payouts are awarded to those hands that end with hands that are classified as winning poker hands. U.S. Pat. No. 5,816,916 (Moody) deals an initial five-card poker hand, and the cards are displayed in five locations. Any matching cards in the first hand are stacked together in a pile and replacement cards are dealt to replace the missing cards. This process continues until there are no matching ranks within the hand. The player then decides which cards to hold or discard. Replacement cards are dealt to those card locations that were discarded. At that time, the hands are evaluated to determine what hands have achieved winning combinations.

U.S. Pat. No. 5,732,950 (Moody) describes a card game that displays up to three five-card hands. Each of the five-card hands are formed into a "21 " and stud poker hand with bets on each. Awards are paid for each of the hands within a given hand group if certain conditions have been achieved. U.S. Pat. No. 5,697,614 (Potter et al.) describes a card game that may be played against a banker's hand or a predetermined payout schedule. The player receives an initial hand and decides which of a set of hand ranking rules they will play the hand against. U.S. Pat. No. 5,660,393 (Dreger) describes a multiple wager game that is played by a dealer and player. The three dealer's cards and the two player's cards form a hand. The player can place a wager on the first card of the dealers. That card must fall within a predetermined range of cards. Once the dealer's second card is revealed, the player has the option of withdrawing the second wager. U.S. Pat. No. 5,544,892 (Breeding) is a multi-tiered wagering game that consists of an initial bet and an optional second bet. The dealer receives two cards and the player receives three cards. The player is now given the option to remove one part of his bet. After the first card is exposed, the player may remove a second portion of his bet. After the dealer's second card is exposed, the wagers are resolved. There is also an option of have a bonus jackpot for the second bet.

U.S. Pat. No. 5,816,915 (Kadlic) allows a multi hand game. This game would use four hands, with two cards being dealt face up and three cards dealt face down. The player would then select the hand they wish to play. The player may then hold or discard any cards they wish to in the hand and a payoff is awarded for certain hand combinations.

All references cited herein are incorporated herein by reference in their entireties.

BRIEF SUMMARY OF THE INVENTION

A method of playing a card game is provided which includes the steps of providing a video display, providing an attract screen that includes a list of selectable card games, providing a game screen that includes several card hand locations, and selecting one of the selectable card games for each of the card hand locations (or selecting a prearranged group of card hands or using the groups that are predetermined by machine). The method further includes providing a means to bet at least one credit at each of the card hand locations, dealing a first hand of cards at a first of the card hand locations from a first deck of cards and determining a mathematical value for the first hand of cards based on the probability and amount of potential payoff. The method then includes the steps of dealing hands of cards at all remaining card hand locations with each hand having cards from a separate (or a subset of a) deck of cards (or like display) and each hand (or like display) having a mathematical value equal to or greater than the mathematical value of the first hand (or like display). The method then allows the player to hold and draw cards in accordance with the selected card game. Finally, the player is paid in accordance with a pay table associated with the value of each hand played. Optionally, the player may select one or more of the hands of cards to continue play after all hands are dealt, and the player may move the bet associated with each hand to the selected one or more other hands.

In a first preferred embodiment of the present invention, a method of playing a card game is provided which includes the steps of providing a plurality of card hand locations, betting at least one credit at each of the card hand locations, dealing a first hand of cards at a first of the card hand locations from a deck of cards, determining a mathematical value for the first hand of cards, dealing hands of cards at all remaining card hand locations, each hand having a mathematical value about equal to the mathematical value of the first hand, and crediting the player in accordance with a pay table associated with the value of each hand played.

Preferably, a video display is provided. The initial screen on the video display may include a plurality of selectable card games. The player may select one of the plurality of selectable card games for each of the card hand locations. Preferably, each hand is dealt from a separate deck of cards. Subsequent to betting and dealing all the hands, the player may hold and draw cards for each selected card game.

Optionally, after dealing all of the hands and prior to holding and drawing cards, a player may select at least one of the hands of cards for continued play (and abandon the other hands). Here, the player may move the bet from the nonselected hands to the selected one or more hands.

In an another preferred embodiment of the present invention, a method of playing a card game is provided which includes the steps of providing a plurality of card hand locations, betting at least one credit at each of the card hand locations, dealing a first hand of cards at a first of the card hand locations from a deck of cards, determining a mathematical value for the first hand of cards for each of a plurality of winning combinations, dealing hands of cards at all remaining card hand locations, determining a mathematical value for each hand at all remaining card hand locations for each of a plurality of winning combinations, assigning a potential award value to the first hand of cards for each type of winning combination, determining an award card factor for each type of winning combination in the first hand by multiplying the potential award value for each type of winning combination for the first hand of cards by the mathematical value for each type of winning combination for the first hand of cards, dividing the award card factor for each type of winning combination by the mathematical value for each type of winning combination associated with each remaining card hand location to determine a set of potential award values for each remaining card hand location which correspond to each type of winning combination, providing an award card table for each hand where the award card table lists the set of potential award values for each hand, and crediting the player in accordance with the award card table associated with the value of each hand played.

In another embodiment of the present invention, a method of playing a card game is provided which includes the steps of providing a plurality of card hand locations, betting at least one credit at each of the card hand locations, dealing a first hand of cards at a first of the card hand locations from a deck of cards, determining a mathematical value for the first hand of cards for each of a plurality of winning combinations, dealing hands of cards at all remaining card hand locations, determining a mathematical value for each hand at all remaining card hand locations for each of a plurality of winning combinations, and crediting in accordance with a pay table associated with the value of each hand played such that the mathematical value of the first hand multiplied by an award for each winning combination in the first hand is equal to the mathematical value of each remaining hand times an award for each winning combination.

In another embodiment of the present invention, a method of playing a card game is provided which includes the steps of providing a video display, providing an initial screen that includes a plurality of selectable card games, providing a game screen that includes a plurality of hand locations, selecting one of the plurality of selectable card games for each of the card hand locations, bettting at least one credit at each of the card hand locations, dealing a first hand of cards at a first of the card hand locations from a deck of cards, determining a mathematical value for the first hand of cards, dealing hands of cards at all remaining card hand locations, each hand having a mathematical value about equal to the mathematical value of the first hand, holding and drawing cards in accordance with each selected card game; and crediting the player in accordance with a pay table associated with the value of each hand played.

In another preferred embodiment of the present invention, a method of playing a card game is provided which includes the steps of providing a video display, providing an initial screen that includes a plurality of selectable card games, providing a game screen that includes a plurality of hand locations, selecting one of the plurality of selectable card games for each of the card hand locations, bettting at least one credit at each of the card hand locations, dealing a first hand of cards at a first of the card hand locations from a deck of cards, determining a mathematical value for the first hand of cards for each of a plurality of winning combinations, dealing hands of cards at all remaining card hand locations, determining a mathematical value for each hand at all remaining card hand locations for each of a plurality of winning combinations, assigning a potential award value to the first hand of cards for each type of winning combination, determining an award card factor for each type of winning combination in the first hand by multiplying the potential award value for each type of winning combination for the first hand of cards by the mathematical value for each type of winning combination for the first hand of cards, dividing the award card factor for each type of winning combination by the mathematical value for each type of winning combination associated with each remaining card hand location to determine a set of potential award values for each remaining card hand location which correspond to each type of winning combination, providing an award card table for each hand, the award card table listing the set of potential award values for each hand; and crediting the player in accordance with the award card table associated with the value of each hand played.

In yet another preferred embodiment of the present invention, a method of playing a card game is provided which includes the steps of providing a video display, providing an initial screen that includes a plurality of selectable card games, providing a game screen that includes a plurality of hand locations, selecting one of the plurality of selectable card games for each of the card hand locations, betting at least one credit at each of the card hand locations, dealing a first hand of cards at a first of the card hand locations from a deck of cards, determining a mathematical value for the first hand of cards for each of a plurality of winning combinations, dealing hands of cards at all remaining card hand locations, determining a mathematical value for each hand at all remaining card hand locations for each of a plurality of winning combinations, and crediting in accordance with a pay table associated with the value of each hand played such that the mathematical value of the first hand multiplied by an award for each winning combination in the first hand is equal to the mathematical value of each remaining hand times an award for each winning combination.

Finally, in yet another preferred embodiment of the present invention, a method of playing a card game is provided which includes the step of providing a plurality of card hand locations, betting at least one credit at each of the card hand locations, dealing hands of cards at each card hand location, selecting at least one hand of cards for continued play, holding and drawing cards for each card game selected for continued play, and crediting the player in accordance with a pay table associated with the value of each hand played.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The present invention is a modification of conventional electronic video poker. In the basic form of conventional video poker, the player is dealt five cards all face up from a single fifty-two card deck. The player selects which cards to hold and discards the unwanted cards. Replacement cards are dealt from the same fifty-two card deck for the discarded cards and the player has a final five card hand. This hand is compared to a pay table based on conventional poker hand ranking. If the player has a winning hand, he receives an award based on the number of coins, tokens or credits wagered by the player.

Figure 1:
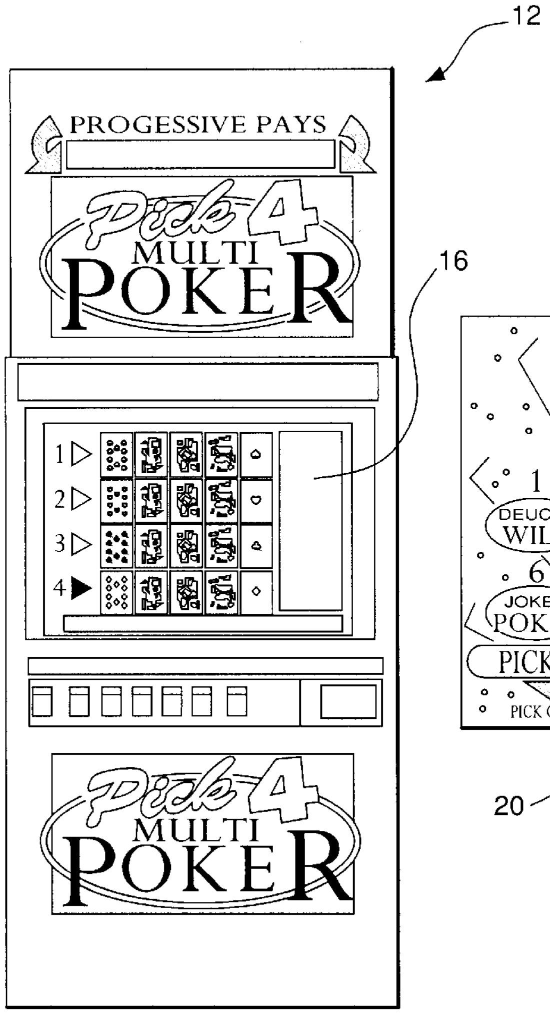
FIG. 1 is a front elevational view of a video gaming system in accordance with one preferred embodiment of the present invention.
Figure 2:
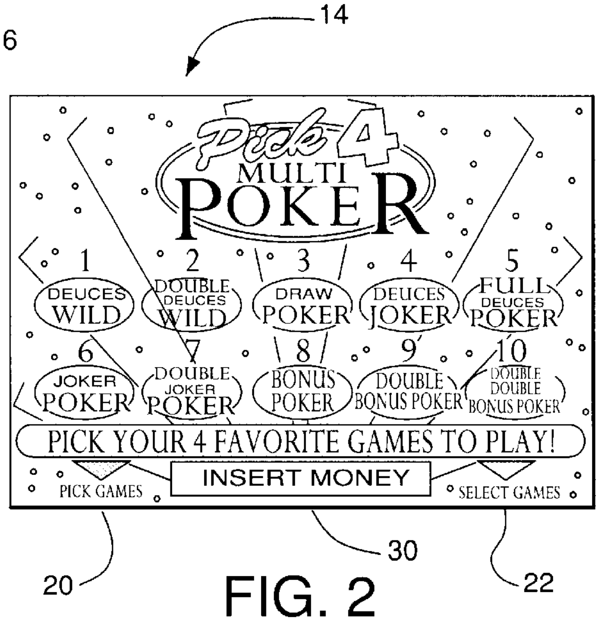
FIG. 2 is an initial "attract" screen of the video gaming system of FIG. 1.
Figure 4:
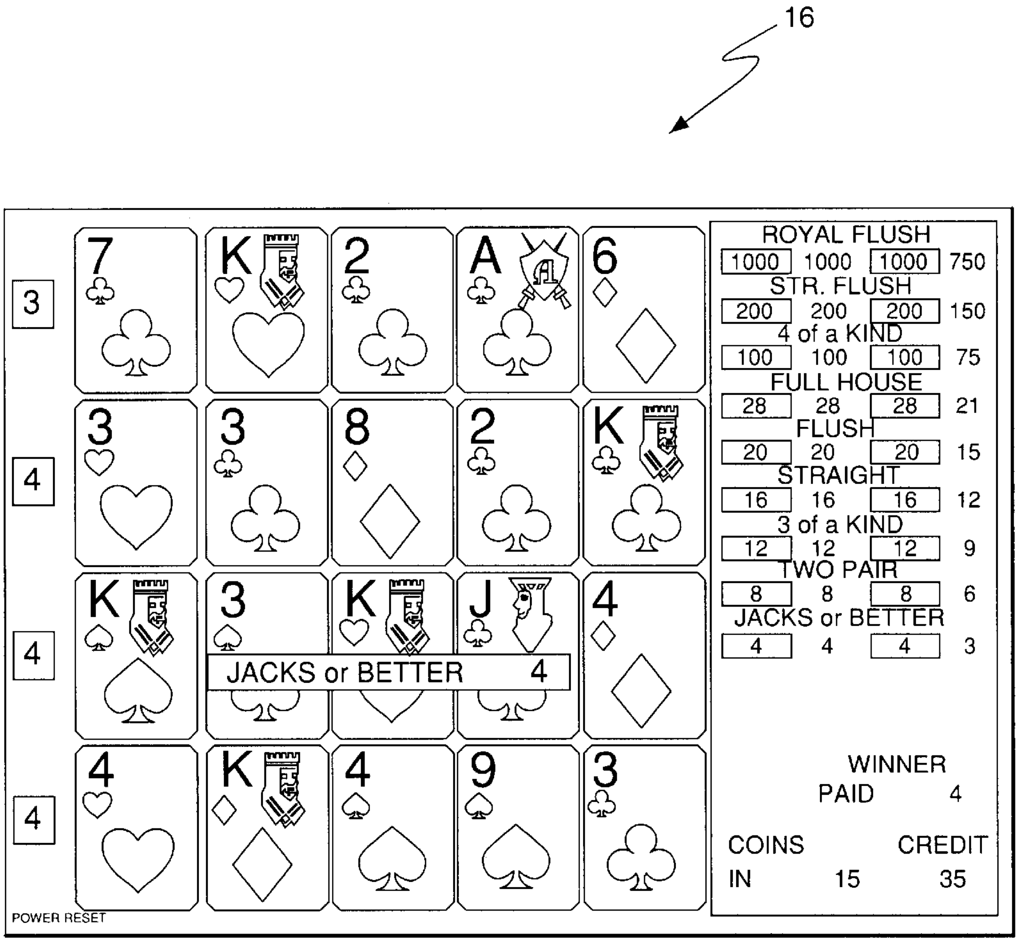
FIG. 4 is a game screen of the video gaming system of FIG. 1.

Referring now to the drawings, wherein like part numbers refer to like elements throughout the several views, there is shown in FIG. 1, a video gaming system 12 in accordance with one preferred embodiment of the present invention. The system 12 preferably has an "attract" screen 14, as shown in FIG. 2, to attract a player to approach the system 12. This attract screen 14 may depict, for example, ten games, designated 1–10 on the screen of FIG. 2, that the player may select from to play. Of course, the attract screen 14 could have greater than or less than ten games to select from (or the games can be preselected in groups selected by a computer program). For example, the screen could have as few as one game (however, for this type of game, no selection need be made), to as many as twenty or more games (not shown). Additionally, while the attract screen 14 of FIG. 2 depicts ten different poker games, for example, "deuces wild", "joker poker", "bonus poker", and the like, substantially any type of poker game or other similar and suitable card game used in the video gaming industry could be utilized in the present invention. The attract screen 14 allows a player to make his or her selections of, for example, his or her four favorite games to be displayed on a game screen (see FIGS. 1 and 4)(these games could also be displayed in pre-arranged groups or preselected by the computer program). While FIGS. 1 and 4 depict a video gaming system 12 having four hands, it is anticipated that the present invention can accommodate as few as two hands and as many hands as could reasonably fit on a screen, for example, twenty hands.

Figure 3:
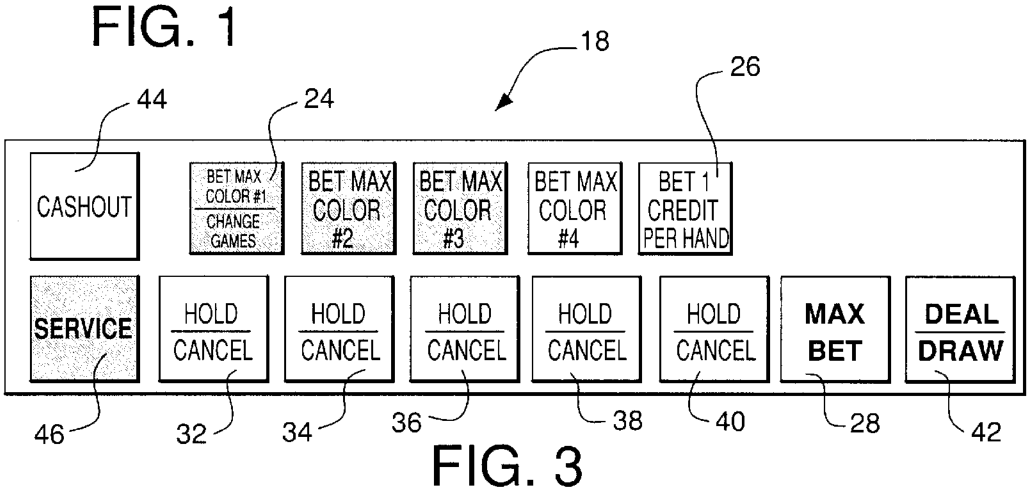
FIG. 3 is a button deck for use with the video gaming system of FIG. 1.

The player will then use various buttons on the button deck 18 (see FIG. 3) associated with the video gaming system 12 to select the game or games that he or she wishes to play. It is noted that each button on the button deck 18 may serve to initiate one, or more than one, function. For example, the attract screen 14 or game screen 16 may have an icon that points to one or more buttons on the button deck 18 for the player to use to perform a particular function. Additionally, during different points in the play, a single button may be associated with different functions wherein other functions associated with that function are disabled. It is noted that the video display screen, as shown, can be a touch screen, as well known in the art. Therefore, this touchscreen may be used alone in lieu of the button deck or in combination with the button deck 18.

In the preferred embodiment, the player is not required to play the number of hands the video gaming system 12 is capable of displaying. For example, if the video gaming system 12 is capable of displaying ten hands, the player may select, for example, only three hands to play. The video gaming system 12, as shown in FIGS. 1 and 4 depicts four hands.

The games to be played are now selected. A "pick games" button, for example, a button below the "pick games" icon 20 on the attract screen 14, may move highlighting or a cursor to associate the pick games icon 20 with one particular game displayed. By depressing the button associated with the "pick games" icon 20, each different game will be sequentially highlighted. A button associated with "select games" icon 22 will allow the player to make the selection of the game or games he or she wishes to play and be displayed on the game screen 16 (to be discussed below). Once all of the games desired to be played have been selected, the video gaming system 12 moves to the game screen 16 with newly dealt hands displayed at hand locations. At this point, the hands are not shown. As mentioned previously, these hands could be preselected in various ways already described.

Alternatively, the video gaming system 12 can omit the game selection feature, as described above. Here, the system 12 would be preloaded with a two or more games. These games may be identical, e.g., four hands of "deuces wild" poker, or they may have one or more different games that are preloaded. Also, alternatively, all the hands may be the same preloaded game. Alternatively, the games may be a preloaded game set that may or may not be selectable.

When the attract screen 14 transitions to the game screen 16 (see FIG. 4), the player, at any time, can go back to the attract screen 14 and change his "lineup" of hands, by pressing a "change games" button 24 on the button deck 18. Here, the change games button 24 (which is not otherwise functional during the time the game screen is functional) will act to take the player back to the attract screen 14 to reselect his lineup of games, prior to additional play or to change his lineup after he has been playing. The change games button 24 preferably becomes inoperable after credits have been bet for a game and is reactivated once a set of hands has been played.

The video gaming system 12 is adapted to accept money at any time through a money acceptor in the form of bills into a bill acceptor, coins or tokens into a coin acceptor, credit or debit cards into a card reader, or through biometric transfer from a thumbprint, retina scan digital photo, or the like. A combination of one or more of these forms of payment may also be possible. The player now has "credits" on the game to play and is ready to play. The money may be inserted into the money acceptor during the time the attract screen is displayed or at any time until a point after the lineup of hands has been selected, as described above. The display screen, i.e., the attract screen 14 or the game screen 16, will always display the icon "insert money" 30 to begin play or to when credits have been depleted until money has been inserted.

The game screen 16 will indicate credits available on a credit meter. In the preferred embodiment of the present invention, the player can bet, by depressing the "bet one credit per hand" button 26, for example, for the four hands in the embodiment of FIG. 1 shown. The player may continue to push this button 26 until he or she has bet the desired credits, up to the maximum bet per hand. The maximum bet is predetermined in the game software and is preferably not adjustable by the player but by the operator. A system having unlimited betting (or betting as little as 1 credit total and everything in between) is also within the scope of this invention.

When the maximum bet is attained either by betting one credit per hand until the maximum is reached or by hitting the "max bet" button 28, playing the maximum credits all at once, or when betting is otherwise complete, the cards are dealt preferably from the bottom hand, Row 1 up. Pay tables for each of the four hands are displayed to the right of each hand and depend upon the game selected and the percent payback tables in software for each game. The player is preferably required to bet a minimum of one coin on each hands up to a maximum number of coins. Each hand preferably (but not absolutely necessarily) must have the same number of coins bet on each hand.

The player hits the draw button (draw/deal button 42) and the cards are dealt and visible face up. Dealing is in accordance with the present invention, as described in detail below. FIGS. 1 and 4 display an example of the game screen 16 which depicts four selected poker hands in Row 1, Row 2, Row 3 and Row 4. Again, the video gaming system 12 of the present invention may display more or less than four hands. After the last game selection is made on the attract screen 14 of FIG. 1, for example, after the fourth game selection is made, the game will preferably automatically transition to the game screen 16. The first hand selected will be placed as the bottom hand, Row 1, and the next 3 hand selections Row 2, Row 3, and Row 4 will be displayed vertically upward from there.

The player now has the option at this time to play out all four hands, i.e., the hand of Row 1, Row 2, Row 3, and Row 4, or bet all his original bet on one of the four hands selected. Each hand is preferably color coded to make selection easier. For example, Row 1 may be yellow, Row 2 may be purple, Row 3 may be green and Row 4 may be red. Two options here will now be described. In the first option a "bet it all" option, the player will select which of the four hands he wishes to play, by selecting a button designated “Bet Max Color 1” (yellow), “Bet Max Color 2” (purple), “Bet Max Color 3” (green), or “Bet Max Color 4” (red) such that the video gaming system 12 will bet all original credits wagered (that were bet on all hands) and the money will be transferred to the hand selected. The other three hands will disappear. For example, in FIG. 1, a player may select the hand of Row 2. Row 1, Row 3, and Row 4 will disappear from the game screen 16. That is, one set of cards will be on the game screen 16 and the hold buttons 32, 34, 36, 38, 40 will be lit up like a standard video poker game, as known in the art. The player will hold and draw cards in an identical manner to standard poker and be paid according to the pay table displayed. The pay table to the right of the cards will only be displayed for the selected game that the player has decided to play. The player will be paid as in standard poker. If the player wants to cancel this operation, i.e, the player does not want to play the maximum bet on a single hand, the player may, for example, simply push the selected “Bet Max Color” button a second time and the game screen will reappear exactly as the game was originally dealt with the four hands displayed.

Rather than betting the entire amount on the game on a single hand, the player may bet on each hand individually, as follows. Once all four hands of Row 1, Row 2, Row 3, and Row 4 have been dealt, the video gaming system 12 will preferably have a feature that optionally automatically holds the cards for each hand in manner that gives the player the highest mathematical probability of success. This “autohold” feature is common video poker games. The four hands of Row 1, Row 2, Row 3, and Row 4 will be displayed with the hold selections automatically made for the player. The player can choose to use the autohold for any of the games or cancel or add to these selections at his discretion. The autohold feature can also be used in the embodiment above. The player will use the five hold/cancel buttons 32, 34, 36, 38, 40 to hold additional cards or cancel the autohold selection for each card for each hand played, in a manner as known in the art. The five hold/cancel buttons 32, 34, 36, 38, 40 correspond to the five cards for each game and will cursor up starting at the game on the bottom and move up to each hand until selections for all four hands are completed, and held as desired by the player. The player then presses the “deal/draw” button 42 and the hands will be completed and paid according to the ending result on each pay table just like standard poker, as known in the art.

Optionally, in another embodiment, the player may distribute his wager between all hands depending on which ones the player likes the most or least. For example, if again there are three hands, the player may elect to bet one-half of his wager on the first hand and one-fourth of his wager on each of the second and third hands.

Finally, optionally, in another embodiment, the initial bet may be placed only on the first hand. After the other hands are dealt, the player has the option of moving money to play any or all of the remaining hands or keeping the money bet on the original hand.

The pay tables used by the video gaming system 12 are dynamic and change depending upon the credits bet, the different game types, and the “bet it all” possibility and are (preferably) to the right of the cards. Adjacent to the cards (preferably either to the side or below) are a “credit meter”, a “win meter”, a “credits bet” display, a “game over” icon, “winner paid” meters, a message screen and the like (not shown), as in other video poker systems known in the art. These can change depending on regulations for worldwide use. The game can have progressive capability on any number of different jackpot combinations, as known.

The game will preferably use separate fifty-two card decks for each different hand or separate fifty-three card decks (for, for example, the joker and double joker wild game hands). A “cashout” button 44 and a “service” button 46 (for change and the like), as in standard poker games known in the art may also be included. Payouts can be in the form of a coins, tickets, data input into to debit or credit card, or can be transferred biometrically, or other means known in the art.

The dealing of the hands in accordance with one special aspect of the present invention will now be described in detail. From a first deck corresponding to the game selected for the hand of Row 1, a first hand, i.e., Row 1 is dealt. Every hand of poker has a known mathematical value that has a particular probability for a payout of a particular value. Once Row 1 is dealt, a group of hands is dealt from separate decks (or subsets of decks or predetermined groups of things with like mathematical values) for each corresponding hand in Rows 2, 3 and 4, etc., based on the cards dealt in Row 1, that yield the mathematical value, as described above, that has approximately the same probability for a like payout as in the hand of Row 1. That is, a hand of cards of a particular mathematical value associated with that of Row 1 is randomly selected to form the hands of Rows 2, 3, and 4. The mathematical values may be based on algorithms, or, more preferably, based on mathematic tables. These values are commonly known in the gaming industry and are mathematically calculated values that reflect the probability of improving that hand based on the award schedule offered to the player. All four hands may be displayed essentially simultaneously. In essence, four hands are displayed, that may or may not look alike, but each hand has (basically) the same mathematical value. This mathematical value may, in actuality, be slightly more, equal to or slightly less than the exact mathematical value. For purposes of the present invention, “about equal to the mathematical value” is intended to includes values that are slightly more, equal to, or slightly less than the exact mathematical value. However, the mathematical values are substantially close to one another such that the relative payout to a player would be irrelevant to the player. From here, as described above, the player may individually select the one hand he or she thinks looks the best and transfer his entire wager to that hand, or play each individual hand, as described above. The player may now press the draw button and each one of the hands now being played will receive the replacement cards from the hands’ respective separate decks to complete each hand. Winning hands will be paid to the player.

Another option of this invention would be the substitution of other “pictures” that have basically the same mathematical value as the first “picture” displayed and do not necessarily have to be poker card symbols. They could be, for example, 5 slot symbols or 5 random “prize doors” or combinations of cards and other mathematically similar values. Cards are mentioned throughout this document only as the preferred variety mentioned but the present application does not intend to be limited in scope to cards.

An alternative embodiment of the present invention will now be described in detail. From a first deck corresponding to the game selected for the hand of Row 1, a first hand, i.e., Row 1 is dealt. As described above, every hand of poker has a known set of mathematical values that is a particular probability for payout of a particular value for each type of winning combination. A winning combination is, for example, a pair, a straight, a flush, a royal flush, etc. Once Row 1 is dealt, a group of hands is dealt from separate decks (or subsets of decks) for each corresponding hand in Rows 2, 3 and 4, etc. A separate pay table, i.e., an "award card" is generated for each hand displayed. The values on the award card give each individual hand essentially the same probability for a like payout as in the hand of Row 1. That is, a hand of cards of a particular set of mathematical values is dealt in Row 1. For example, the set of mathematical values for the hand of Row 1 may be 0.001 chance of obtaining a royal flush, a 0.01 chance of obtaining a straight flush, a 0.05 chance of winning a four of a kind, etc. A hand of cards of a different set of mathematical values is dealt in row 2. A hand of cards of yet another set of mathematical values is dealt in Rows 3 and 4, etc. The award cards equalize the probability for a like payout among all hands dealt. That is, while the set of mathematical values of a subsequent hand may be lower (or higher) than that of the hand of Row 1, the value of the award goes correspondingly higher (or lower) to achieve a net result of having all hands having substantially equal odds for winning a given amount of money for each type of winning combination in a hand.

For example, assume that the hand of Row 1 has a mathematical value of 0.001 for a chance of obtaining a royal flush to win an award of $1000, a mathematical value of 0.01 chance of obtaining a straight flush with an award of $500, a mathematical value of 0.005 for a chance of obtaining a four of a kind with an award of $250.00, etc. For purposes of this invention, the value of the royal flush hand is 0.001 multiplied by $1000.00 to equal an award card factor value of 1. Now assume that the hand of Row 2 has a mathematical value of 0.002 for a chance of obtaining a royal flush. To achieve a value of this hand equal to the award card factor value of 1, the award card value (1) is divided by the mathematical value of 0.002 which results in a chance to win $ 500.00. Like calculations are made for each type of winning combination. For example, as stated above, in the first hand, if the chance of obtaining a straight flush has a mathematical value of 0.01 for an award of $500. The award card factor is 0.01 times 500 or 5. The mathematical value for the chance of obtaining a straight flush in the second hand may be 0.02. The award card value here is 5 which is then divided by the mathematical value of 0.02 which yields a potential award equal to $250. Of course, in this example, the specific mathematical values and award card factors here are simplified numbers for purposes of this explanation. Actual mathematical values of various hands of cards would vary substantially. Similar calculations are made for all sets of winning combinations for all hands played.

In summary, a first hand is dealt which yields a set of mathematical values for each type of winning combination. A potential award value is assigned to each of the different types of winning combinations. An award card value is obtained for each type of winning combination by multiplying its associated mathematical value by its potential award value. Subsequent hands are played each of which has its own set of mathematical values for each type of winning combination. The award card value obtained for the first hand for each type of winning combination is then divided by the mathematical value for each type of winning combination in each subsequent hand to obtain a potential award amount.

Optionally, in this embodiment, the type of five card poker being played, e.g., Deuces Wild, Joker Poker, may be selected prior to the first hand being dealt, immediately subsequent to the first hand being dealt, or subsequent to all hands being dealt. Mathematical values are based on these choices.

Again, here, the values in the award card table may be the same, slightly greater than, or slightly less than the precise number calculated for the first hand.

Optionally, the potential award value for the first hand may be randomly determined by software in the game, may use sequential preprogrammed values, or another similar system may be used.

While the invention has been described in detail and with reference to specific examples thereof, it will be apparent to one skilled in the art that various changes and modifications can be made therein without departing from the spirit and scope thereof.

What is claimed is:

1. A method of playing a card game, comprising the steps of:

(a) providing a plurality of card hand locations;

(b) betting at least one credit at each of the card hand locations;

(c) dealing a first hand of cards at a first of the card hand locations from a deck of cards;

(d) determining a mathematical value for the first hand of cards;

(e) dealing hands of cards at all remaining card hand locations, each hand having a mathematical value about equal to the mathematical value of the first hand; and (f) crediting in accordance with a pay table associated with the value of each hand played.

2. The method of playing the card game of claim 1, including the step of providing a video display.

3. The method of playing the card game of claim 2, including the step of providing an initial screen that includes a plurality of selectable card games and the step of selecting one of the plurality of selectable card games for each of the card hand locations.

4. The method of playing the card game of claim 1, wherein the steps of dealing includes dealing hands having cards from separate decks of cards.

5. The method of playing the card game of claim 1, including the step of holding and drawing cards for each selected card game.

6. The method of playing the card game of claim 1, including the step of selecting at least one of the hands of cards for continued play subsequent to the step of dealing hands of cards at all remaining card hand locations.

7. The method of playing the card game of claim 6, including the step of moving the bet from at least one hand to the selected one or more hands.

8. A method of playing a card game, comprising the steps of:

(a) providing a plurality of card hand locations;

(b) betting at least one credit at each of the card hand locations;

(c) dealing a first hand of cards at a first of the card hand locations from a deck of cards;

(d) determining a mathematical value for the first hand of cards for each of a plurality of winning combinations;

(e) dealing hands of cards at all remaining card hand locations, (f) determining a mathematical value for each hand at all remaining card hand locations for each of a plurality of winning combinations;

(g) assigning a potential award value to the first hand of cards for each type of winning combination;

(h) determining an award card factor for each type of winning combination in the first hand by multiplying the potential award value for each type of winning combination for the first hand of cards by the mathematical value for each type of winning combination for the first hand of cards;

(i) dividing the award card factor for each type of winning combination by the mathematical value for each type of winning combination associated with each remaining card hand location to determine a set of potential award values for each remaining card hand location which correspond to each type of winning combination;

(j) providing an award card table for each hand, the award card table listing the set of potential award values for each hand; and (k) crediting in accordance with the award card table associated with the value of each hand played.

9. The method of playing the card game of claim 8, including the step of providing a video display.

10. The method of playing the card game of claim 9, including the step of providing an initial screen that includes a plurality of selectable card games and the step of selecting one of the plurality of selectable card games for each of the card hand locations.

11. The method of playing the card game of claim 8, wherein the steps of dealing include dealing hands having cards from separate decks of cards.

12. The method of playing the card game of claim 8, including the step of holding and drawing cards for each selected card game.

13. The method of playing the card game of claim 8, including the step of selecting at least one of the hands of cards for continued play subsequent to the step of dealing hands of cards at all remaining card hand locations.

14. The method of playing the card game of claim 13, including the step of moving the bet from at least one hand to the selected one or more hands.

15. A method of playing a card game, comprising the steps of:

(a) providing a plurality of card hand locations;

(b) betting at least one credit at each of the card hand locations;

(c) dealing a first hand of cards at a first of the card hand locations from a deck of cards;

(d) determining a mathematical value for the first hand of cards for each of a plurality of winning combinations;

(e) dealing hands of cards at all remaining card hand locations, (f) determining a mathematical value for each hand at all remaining card hand locations for each of a plurality of winning combinations; and (g) crediting in accordance with a pay table associated with the value of each hand played such that the mathematical value of the first hand multiplied by an award for each winning combination in the first hand is equal to the mathematical value of each remaining hand times an award for each winning combination.

16. The method of playing the card game of claim 15, including the step of providing a video display.

17. The method of playing the card game of claim 16, including the step of providing an initial screen that includes a plurality of selectable card games and the step of selecting one of the plurality of selectable card games for each of the card hand locations.

18. The method of playing the card game of claim 15, wherein the steps of dealing include dealing hands having cards from separate decks of cards.

19. The method of playing the card game of claim 15, including the step of holding and drawing cards for each selected card game.

20. The method of playing the card game of claim 15, including the step of selecting at least one of the hands of cards for continued play subsequent to the step of dealing hands of cards at all remaining card hand locations.

21. The method of playing the card game of claim 20, including the step of moving the bet from at least one hand to the selected one or more hands.

22. A method of playing a card game, comprising the steps of:

(a) providing a video display;

(b) providing an initial screen that includes a plurality of selectable card games;

(c) providing a game screen that includes a plurality of hand locations;

(d) selecting one of the plurality of selectable card games for each of the card hand locations;

(e) bettting at least one credit at each of the card hand locations;

(f) dealing a first hand of cards at a first of the card hand locations from a deck of cards;

(g) determining a mathematical value for the first hand of cards;

(h) dealing hands of cards at all remaining card hand locations, each hand having a mathematical value about equal to the mathematical value of the first hand;

(i) holding and drawing cards in accordance with each selected card game; and (j) crediting in accordance with a pay table associated with the value of each hand played.

23. The method of claim 22, including the step of selecting one or more of the hands of cards to continue play, and moving the bet from each hand to the selected one or more hands.

24. The method of playing the card game of claim 22, wherein the steps of dealing include dealing hands having cards from separate decks of cards.

25. A method of playing a card game, comprising the steps of:

(a) providing a video display;

(b) providing an initial screen that includes a plurality of selectable card games;

(c) providing a game screen that includes a plurality of hand locations;

(d) selecting one of the plurality of selectable card games for each of the card hand locations;

(e) bettting at least one credit at each of the card hand locations;

(f) dealing a first hand of cards at a first of the card hand locations from a deck of cards;

(g) determining a mathematical value for the first hand of cards for each of a plurality of winning combinations;

(h) dealing hands of cards at all remaining card hand locations, (i) determining a mathematical value for each hand at all remaining card hand locations for each of a plurality of winning combinations;

(j) assigning a potential award value to the first hand of cards for each type of winning combination;

(k) determining an award card factor for each type of winning combination in the first hand by multiplying the potential award value for each type of winning combination for the first hand of cards by the mathematical value for each type of winning combination for the first hand of cards;

(l) dividing the award card factor for each type of winning combination by the mathematical value for each type of winning combination associated with each remaining card hand location to determine a set of potential award values for each remaining card hand location which correspond to each type of winning combination;

(m) providing an award card table for each hand, the award card table listing the set of potential award values for each hand; and (n) crediting in accordance with the award card table associated with the value of each hand played.

26. The method of claim 25, including the step of selecting one or more of the hands of cards to continue play, and moving the bet from each hand to the selected one or more hands.

27. The method of playing the card game of claim 25, wherein the steps of dealing include dealing hands having cards from separate decks of cards.

28. A method of playing a card game, comprising the steps of:

(a) providing a video display;

(b) providing an initial screen that includes a plurality of selectable card games;

(c) providing a game screen that includes a plurality of hand locations;

(d) selecting one of the plurality of selectable card games for each of the card hand locations;

(e) betting at least one credit at each of the card hand locations;

(f) dealing a first hand of cards at a first of the card hand locations from a deck of cards;

(g) determining a mathematical value for the first hand of cards for each of a plurality of winning combinations;

(h) dealing hands of cards at all remaining card hand locations;

(i) determining a mathematical value for each hand at all remaining card hand locations for each of a plurality of winning combinations; and (j) crediting in accordance with a pay table associated with the value of each hand played such that the mathematical value of the first hand multiplied by an award for each winning combination in the first hand is equal to the mathematical value of each remaining hand times an award for each winning combination.

29. The method of claim 28, including the step of selecting one or more of the hands of cards to continue play, and moving the bet from each hand to the selected one or more hands.

30. The method of playing the card game of claim 28, wherein the steps of dealing include dealing hands having cards from separate decks of cards.

31. A method of playing a card game, comprising the steps of:

(a) providing a plurality of card hand locations;

(b) betting at least one credit at each of the card hand locations;

(c) dealing hands of cards at each card hand location;

(d) selecting at least one hand of cards for continued play;

(e) holding and drawing cards for each card game selected for continued play; and (f) crediting in accordance with a pay table associated with the value of each hand played.

32. The method of playing the card game of claim 31, including the step of providing a video display.

33. The method of playing the card game of claim 32, including the step of providing an initial screen that includes a plurality of selectable card games and the step of selecting one of the plurality of selectable card games for each of the card hand locations.

34. The method of playing the card game of claim 31, wherein the step of dealing includes dealing hands having cards from separate decks of cards.

* * * * *